(12) United States Patent
Kim et al.

(10) Patent No.: US 10,389,956 B2
(45) Date of Patent: Aug. 20, 2019

(54) IMAGE SENSOR

(71) Applicant: Samsung Electronics Co., Ltd., Suwon-si, Gyeonggi-do (KR)

(72) Inventors: Moo Young Kim, Suwon-si (KR); Kyoung Min Koh, Hwaseong-si (KR); Woong Joo, Seoul (KR); Mi Ra Lee, Suncheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/873,057

(22) Filed: Jan. 17, 2018

(65) Prior Publication Data

US 2018/0205897 A1 Jul. 19, 2018

(30) Foreign Application Priority Data

Jan. 18, 2017 (KR) .................. 10-2017-0008770
Dec. 27, 2017 (KR) .................. 10-2017-0180921

(51) Int. Cl.
*H04N 5/378* (2011.01)
*H04N 5/357* (2011.01)
*H04N 5/372* (2011.01)
*H04N 5/3745* (2011.01)

(52) U.S. Cl.
CPC .......... *H04N 5/3575* (2013.01); *H04N 5/378* (2013.01); *H04N 5/37213* (2013.01); *H04N 5/37457* (2013.01)

(58) Field of Classification Search
CPC .................................... H04N 5/378
USPC .................. 348/294, 302; 250/208.1
See application file for complete search history.

(56) References Cited

U.S. PATENT DOCUMENTS

| | | | |
|---|---|---|---|
| 6,546,150 B2 | 4/2003 | Inui | |
| 2005/0018061 A1* | 1/2005 | Choi | G11C 27/026 348/255 |
| 2007/0194962 A1* | 8/2007 | Asayama | H03M 1/1014 341/144 |
| 2008/0284886 A1* | 11/2008 | Wakabayashi | H04N 5/335 348/301 |
| 2009/0201402 A1* | 8/2009 | Kim | H04N 5/235 348/300 |
| 2015/0215553 A1* | 7/2015 | Medeiro Hidalgo | H03M 3/46 250/208.1 |
| 2018/0278858 A1* | 9/2018 | Seki | H01L 27/146 |

* cited by examiner

*Primary Examiner* — Anthony J Daniels
(74) *Attorney, Agent, or Firm* — Harness, Dickey & Pierce, P.L.C.

(57) ABSTRACT

Provided are image sensors. An image sensor includes a pixel array comprising pixels configured to output signal voltages, each of the pixels comprising first and second photodiodes, first and second transfer transistors connected to the first and second photodiodes, respectively, and a floating diffusion node to which the first and second transfer transistors are connected; a ramp voltage generator configured to generate a ramp voltage that decreases with a slope according to a ramp clock to have a first gain; a correlation double sampler (CDS) configured to compare the ramp voltage with the signal voltages to output a comparison signal; a counter configured to count the comparison signal according to a counter clock to output a digital signal; and a digital scaling unit configured to scale the digital signal to have a second gain.

19 Claims, 14 Drawing Sheets

| User Gain | x1 | x2 | x4 | x8 | x16 |
|---|---|---|---|---|---|
| Ramp Current (Iramp) | I | I | I/2 | I/4 | I/8 |
| Ramp Load (Rramp) | N | N | N | N | N |
| Ramp Freq. (CLK2) | 0.5F | 0.5F | 0.5F | 0.5F | 0.5F |
| Counter Freq. (CLK1) | F | F | F | F | F |
| Digital Gain | x0.5 | x1 | x1 | x1 | x1 |

FIG. 12

| User Gain | x1 | x2 | x4 | x8 | x16 |
|---|---|---|---|---|---|
| Ramp Current (Iramp) | I | I | I | I | I |
| Ramp Load (Rramp) | N | N | N/2 | N/4 | N/8 |
| Ramp Freq. (CLK2) | 0.5F | 0.5F | 0.5F | 0.5F | 0.5F |
| Counter Freq. (CLK1) | F | F | F | F | F |
| Digital Gain | x0.5 | x1 | x1 | x1 | x1 |

FIG. 13

| User Gain | x1 | x2 | x4 | x8 | x16 |
|---|---|---|---|---|---|
| Analog Gain | x2 | x2 | x4 | x8 | x16 |
| Digital Gain | x0.5 | x1 | x1 | x1 | x1 |

FIG. 17

| User Gain | x1 | x2 | x4 | x8 | x16 |
|---|---|---|---|---|---|
| Ramp Current (Iramp) | I | I | I | I | I |
| Ramp Load (Rramp) | N | N | N/2 | N/4 | N/8 |
| Ramp Freq. (CLK2) | F | F | F | F | F |
| Counter Freq. (CLK1) | F | F | F | F | F |
| Digital Gain | x1 | x2 | x2 | x2 | x2 |

FIG. 18

| User Gain | x1 | x2 | x4 | x8 | x16 |
|---|---|---|---|---|---|
| Analog Gain | x1 | x1 | x2 | x4 | x8 |
| Digital Gain | x1 | x2 | x2 | x2 | x2 |

IMAGE SENSOR

This application claims priority from Korean Patent Application No. 10-2017-0008770 filed on Jan. 18, 2017 and from Korean Patent Application No. 10-2017-0180921 filed on Dec. 27, 2017 in the Korean Intellectual Property Office, the disclosure of which is incorporated herein by reference in its entirety.

BACKGROUND

1. Field of the Disclosure

At least some example embodiments relate to an image sensor.

2. Description of the Related Art

Among semiconductor devices, an image sensor is an element that converts an optical image into an electrical signal. Image sensors may be classified into a charge coupled device (CCD) image sensor and a complementary metal oxide semiconductor (CMOS) image sensor. A CMOS image sensor is abbreviated as a CIS (CMOS image sensor). The CIS has a plurality of pixels arranged two-dimensionally. Each of the pixels includes a photodiode (PD). The photodiode serves to convert incident light into an electrical signal.

Recently, as the computer industry and communications industry evolve, there are growing demands for image sensors with improved performance in a variety of applications such as a digital camera, a camcorder, a personal communication system (PCS), a game device, a surveillance camera, and a medical micro camera. In addition, as the semiconductor device is highly integrated, the image sensor is also highly integrated.

SUMMARY

Example embodiments provide an image sensor with improved operating characteristics by way of eliminating saturation problem in auto-focusing (AF).

It should be noted that example embodiments are not limited to the above-described objects, and other objects will be apparent to those skilled in the art from the following descriptions.

According to an example embodiment, an image sensor may include a pixel array including pixels configured to output signal voltages, each of the pixels including first and second photodiodes and first and second transfer transistors, the first and second transfer transistors each connected between respective ones of the first and second photodiodes and a floating diffusion node; a ramp voltage generator configured to generate a ramp voltage having a first gain such that a slope of the ramp voltage decreases based on a ramp clock; a correlation double sampler (CDS) configured to compare the ramp voltage with signal voltages to output a comparison signal; a counter configured to count the comparison signal according to a counter clock to output a digital signal; and a digital scaler configured to scale the digital signal such that the digital signal has a second gain.

According to another example embodiment, an image sensor may include pixels each including first and second photodiodes, the pixels each configured to output a reset output, a first output and a second output sequentially such that the first output is output by the first photodiode and the second output is output by the first and the second photodiode; a ramp voltage generator configured to generate a ramp voltage having a first gain such that a slope of the ramp voltage decreases according to a ramp clock; a correlated double sampler configured to compare the ramp voltage with each of the reset output, the first output and the second output, and to output a comparison signal based on a result thereof; a counter configured to count the comparison signal according to a counter clock to output a digital signal; a digital scaler configured to scale the digital signal such that the digital signal has a second gain; and a gain controller configured to control the first gain and the second gain to derive different user gains in different ones of a plurality of operation modes, the user gains each being a product of the first gain and the second gain, the plurality of operation modes including first to third operation modes requiring the user gains of ×1, ×2 and ×4, respectively such that the second gain in the first operation mode is equal to half the second gain in the second operation mode.

According to still another example embodiment, an image sensor may include a pixel array including pixels configured to output signal voltages, each of the pixels including a first sub-pixel and a second sub-pixel sharing a floating diffusion node, a reset transistor and a drive transistor, the first sub-pixel including a first photodiode, a second photodiode, a first transfer transistor and a second transfer transistor, the first transfer transistor being between the first photodiode and the floating diffusion node, and the second transfer transistor being between the second photodiode and the floating diffusion node, the second sub-pixel including a third photodiode, a fourth photodiode, a third transfer transistor and a fourth transfer transistor, the third transfer transistor being between the third photodiode and the floating diffusion node, and the fourth transfer transistor between the fourth photodiode and the floating diffusion node; a ramp voltage generator configured to generate a ramp voltage having a first gain such that the ramp voltage decreases with a slope according to a ramp clock; a correlated double sampler (CDS) configured to compare the ramp voltage with the signal voltages to output a comparison signal; a counter configured to count the comparison signal according to a counter clock to output a digital signal; a digital scaler configured to scale the digital signal such that the digital signal has a second gain; and a gain controller configured to control the first gain and the second gain to derive user gains associated with respective ones of a plurality of operation modes, the user gains each being a product of the first gain and the second gain, the plurality of operation modes including a first operation mode, a second operation mode and a third operation mode requiring the user gains of ×1, ×2 and ×4, respectively such that the first gain in the first operation mode is equal to the first gain in the second operation mode and the second gain in the first operation mode is equal to half the second gain in the second operation mode.

BRIEF DESCRIPTION OF THE DRAWINGS

FIG. 12 is a table showing parameters of an image sensor according to some example embodiments;

FIG. 13 is a table for illustrating the analog gains and the digital gains according to the operation modes of the image sensor according to some example embodiments;

FIG. 17 is a table showing parameters of an image sensor according to some example embodiments;

FIG. 18 is a table for illustrating the analog gains and the digital gains according to the operation modes of the image sensor according to some example embodiments;

DETAILED DESCRIPTION

Hereinafter, an image sensor according to some example embodiments will be described with reference to FIGS. 1 to 10.

Figure 1:
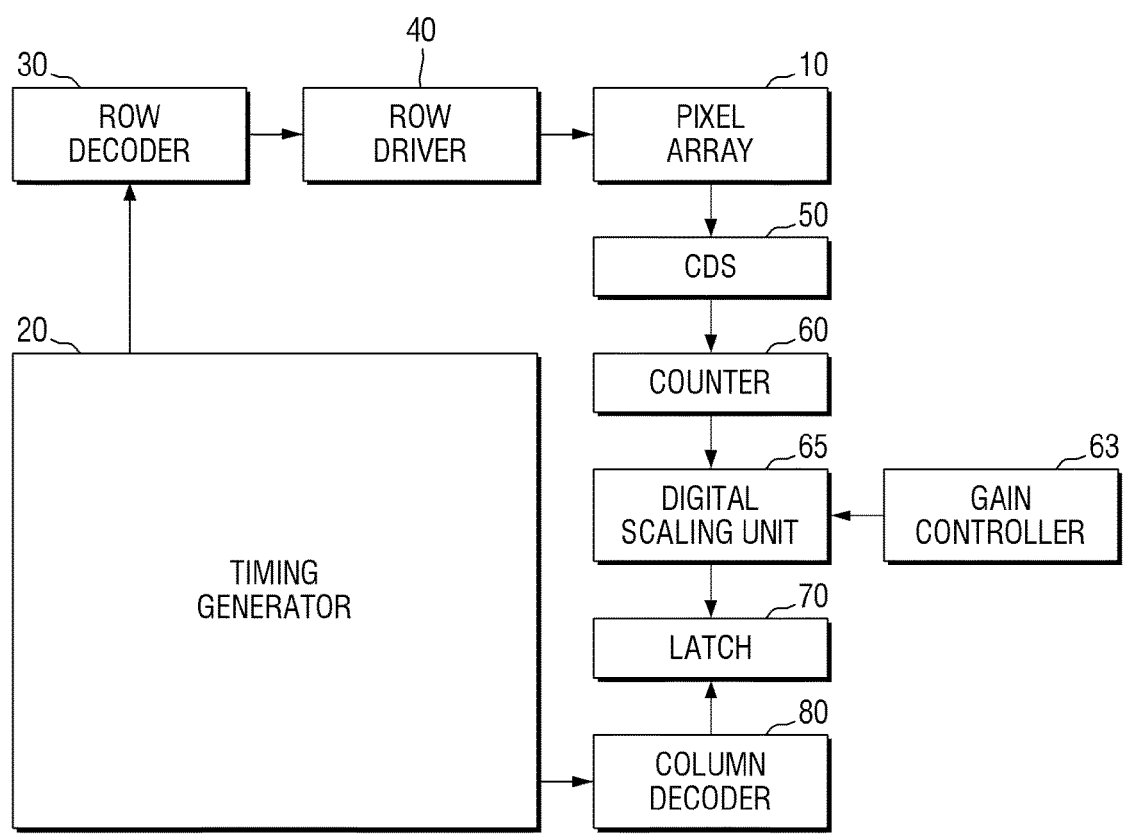
FIG. 1 is a block diagram of an image sensor according to some example embodiments.
Figure 2:
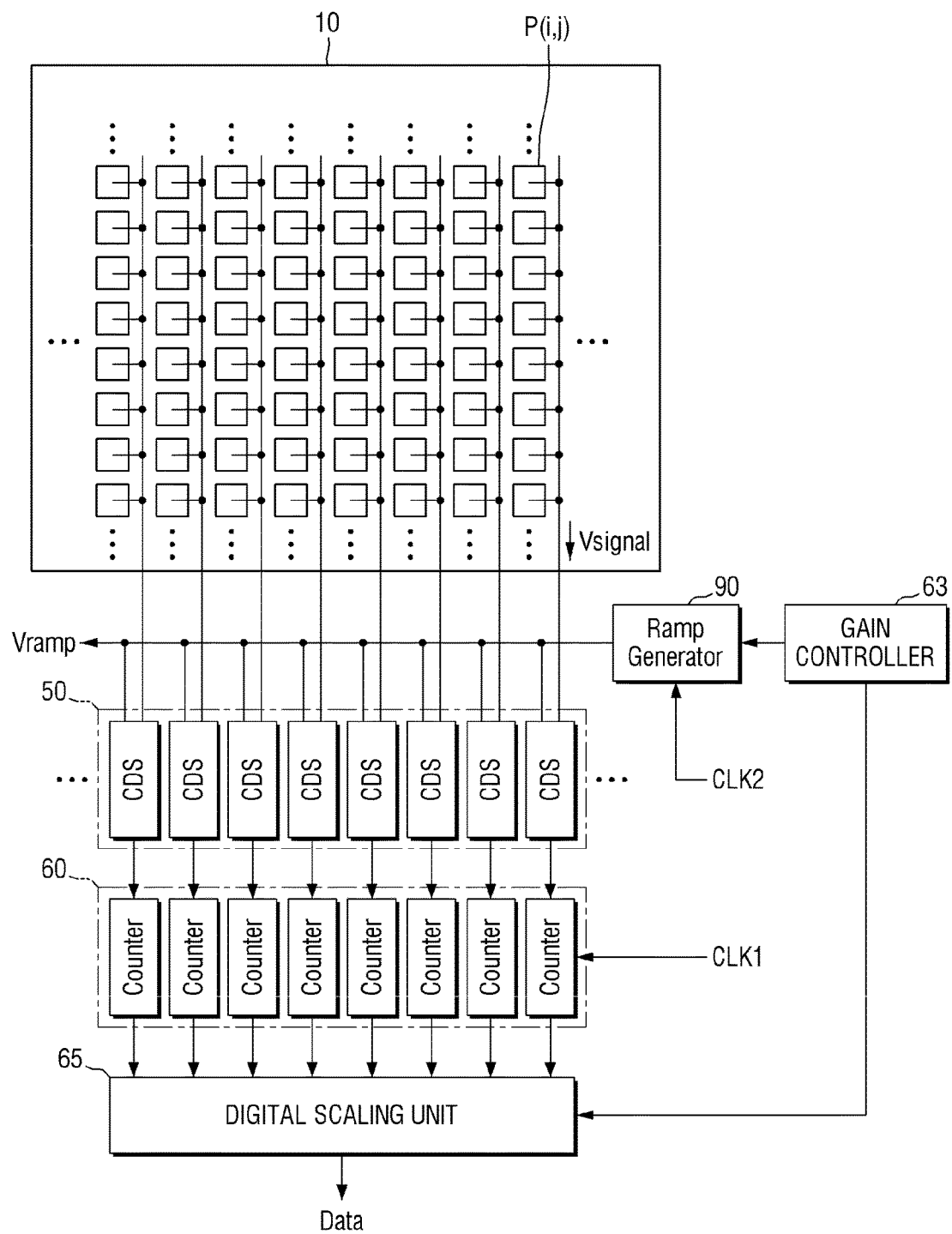
FIG. 2 is a block diagram for illustrating in detail a part of an image sensor according to some example embodiments.
Figure 3:
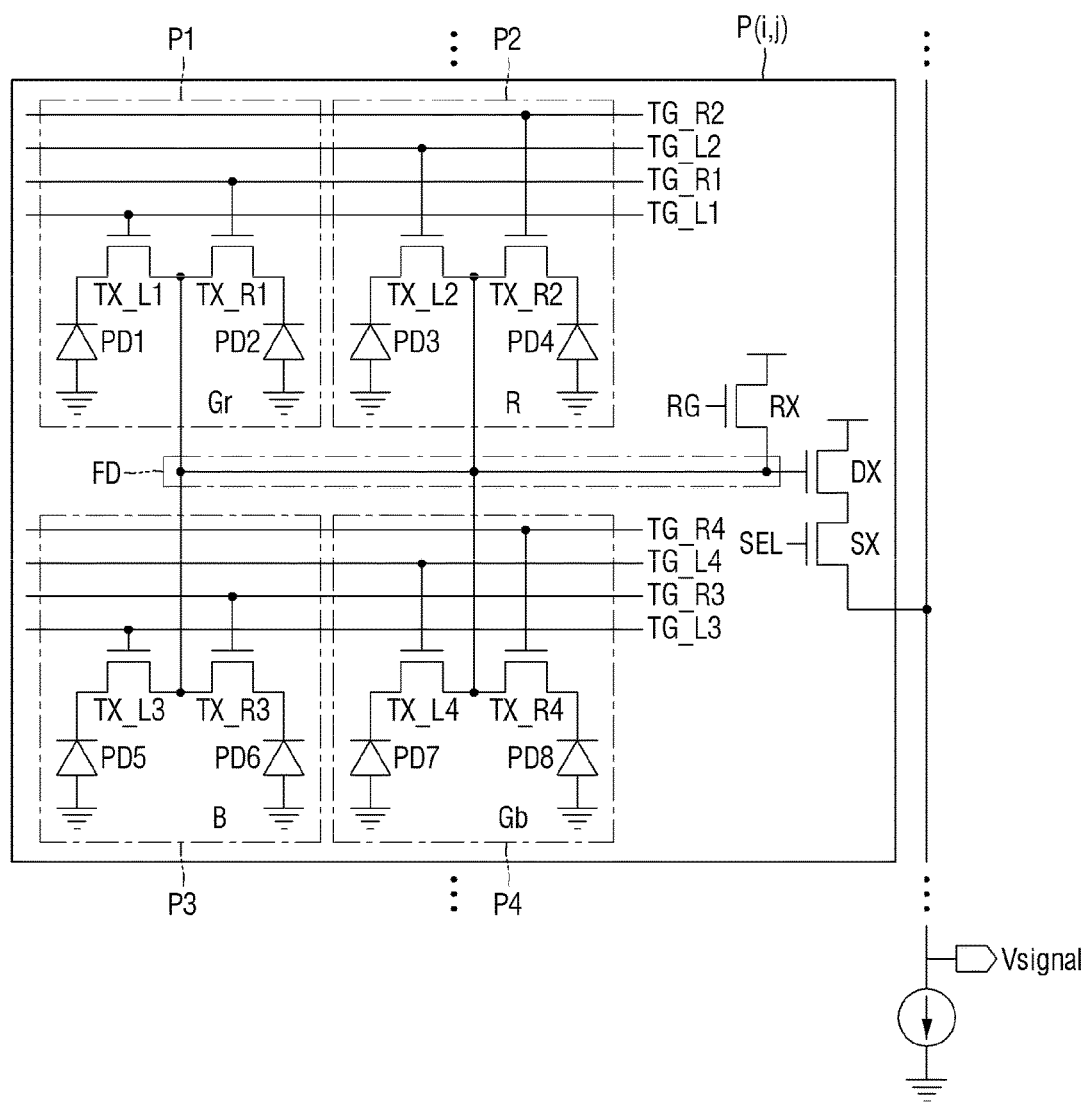
FIG. 3 is an equivalent circuit diagram for illustrating the pixel shown in FIG. 2.
Figure 4:
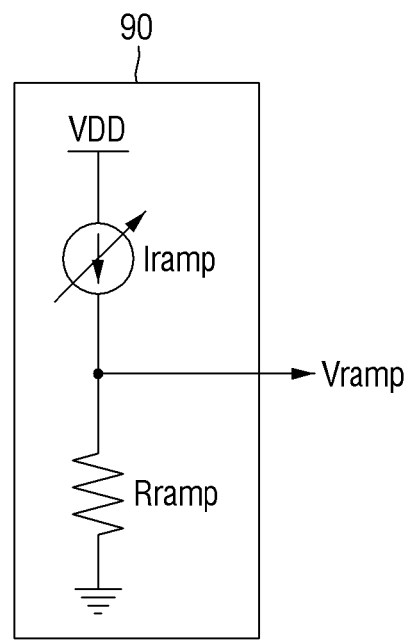
FIG. 4 is a circuit diagram for illustrating in detail the ramp voltage generator shown in FIG. 2.
Figure 5:
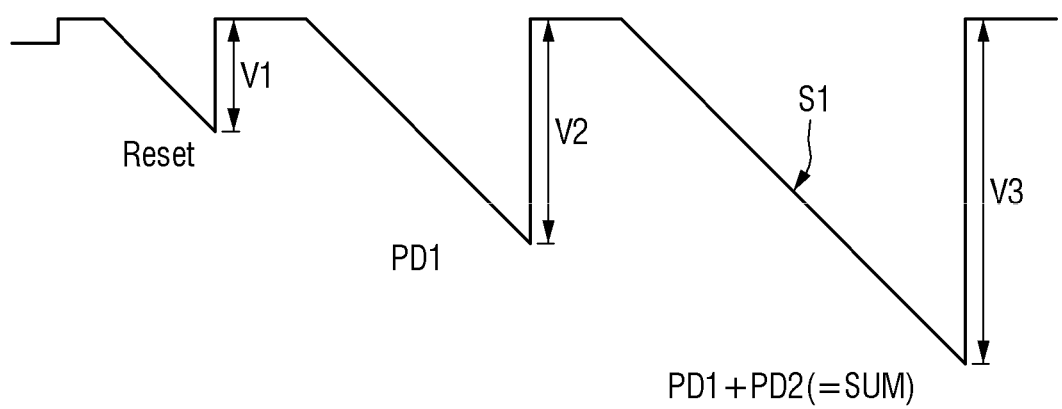
FIG. 5 is a waveform diagram for illustrating a ramp voltage of the image sensor according to some example embodiments.
Figure 6:
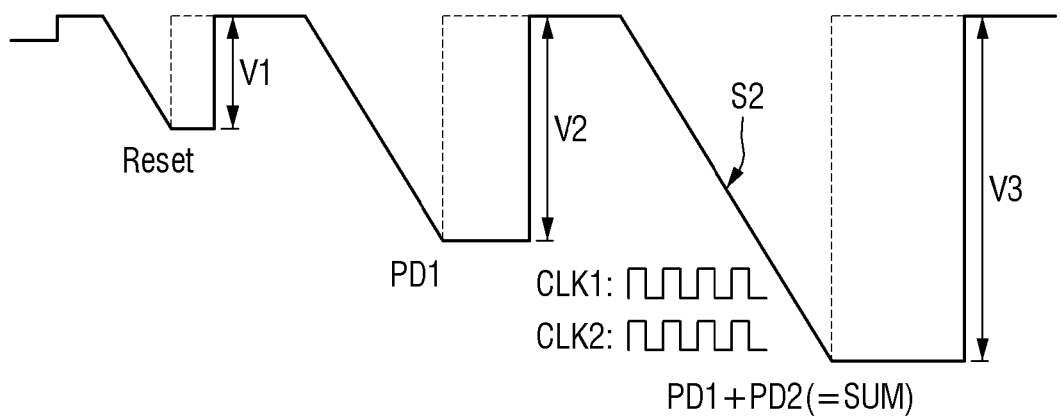
FIGS. 6 and 7 are waveform diagrams for illustrating intermediate steps for generating the ramp voltage of FIG. 5.
Figure 7:
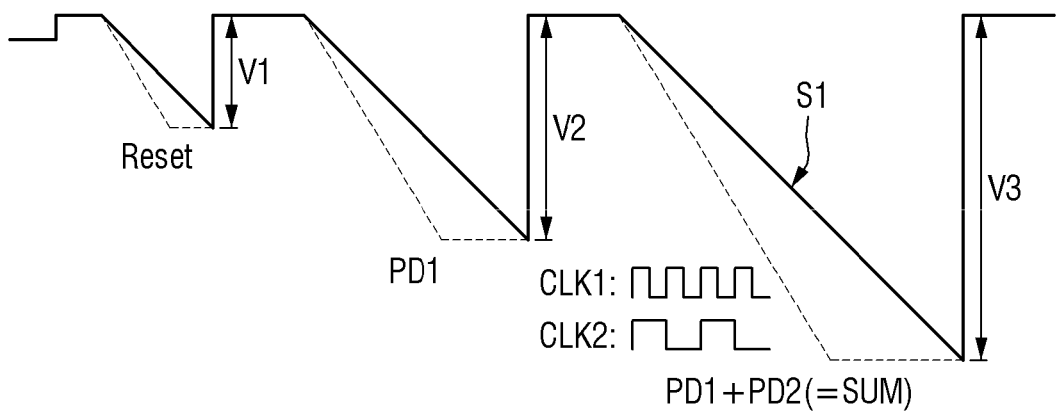
Figure 8:
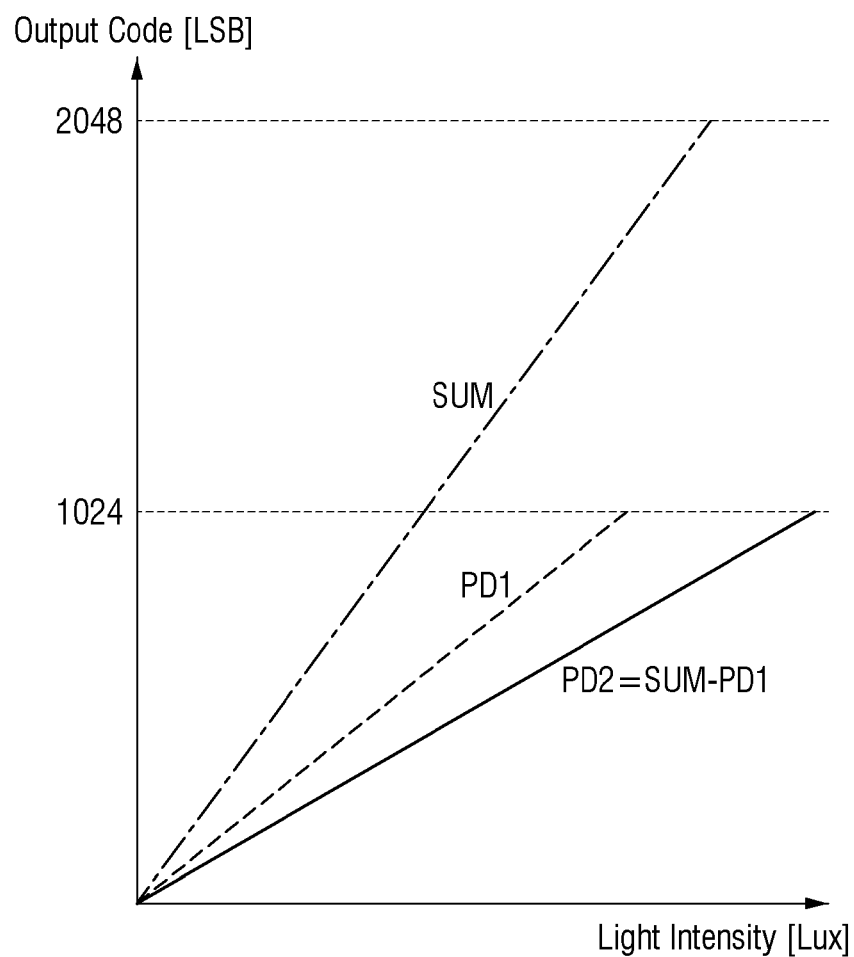
FIG. 8 is a graph for illustrating digital signals of the image sensor according to some example embodiments.
Figure 9:
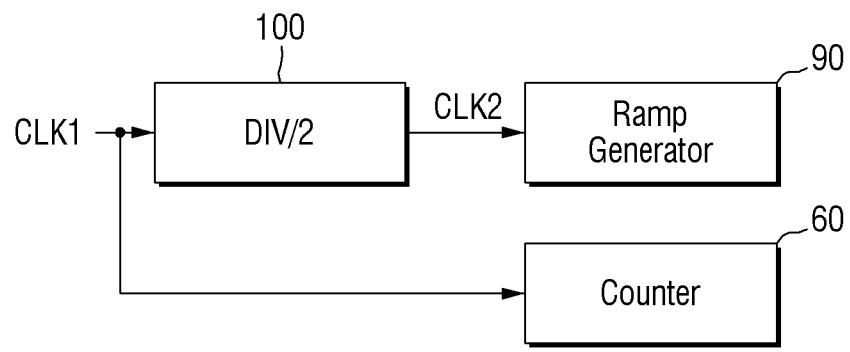
FIG. 9 is a block diagram for illustrating clocks of the image sensor according to some example embodiments.
Figures 10, 11:
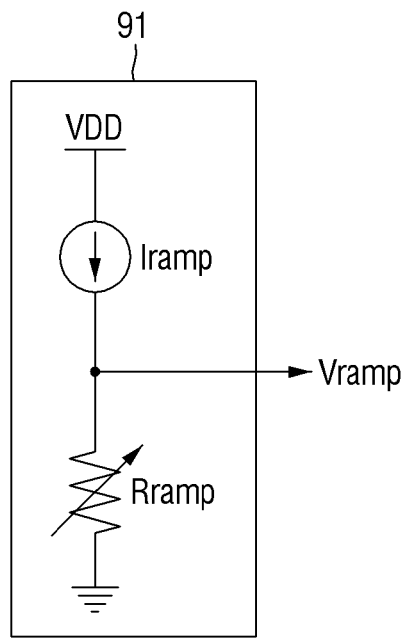
FIG. 10 is a table showing parameters of an image sensor according to some example embodiments.
FIG. 11 is an equivalent circuit diagram for illustrating a ramp voltage generator of an image sensor according to some example embodiments.

FIG. 1 is a block diagram of an image sensor according to some example embodiments. FIG. 2 is a block diagram for illustrating in detail a part of an image sensor according to some example embodiments. FIG. 3 is an equivalent circuit diagram for illustrating the pixel shown in FIG. 2. FIG. 4 is a circuit diagram for illustrating in detail the ramp voltage generator shown in FIG. 2. FIG. 5 is a waveform diagram for illustrating a ramp voltage of the image sensor according to some example embodiments. FIGS. 6 and 7 are waveform diagrams for illustrating intermediate steps for generating the ramp voltage of FIG. 5. FIG. 8 is a graph for illustrating digital signals of the image sensor according to some example embodiments. FIG. 9 is a block diagram for illustrating clocks of the image sensor according to some example embodiments. FIG. 10 is a table showing parameters of an image sensor according to some example embodiments.

Referring to FIG. 1, an image sensor according to some example embodiments may include a pixel array 10 in which pixels each including photodiodes are arranged two-dimensionally, a timing generator 20, a row decoder 30, a row driver 40, a correlated double sampler (CDS) 50, a counter 60, a digital scaling unit 65, a gain controller 63, a latch 70, a column decoder 80, and the like.

In some example embodiments, the image sensor may include the pixel array 10, a memory and processing circuitry (not shown).

The memory (not shown) may include at least one of a volatile memory, non-volatile memory, random access memory (RAM), a flash memory, a hard disk drive, and an optical disk drive.

The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design or execution of computer readable instructions stored in the memory (not shown), as a special purpose computer to perform the functions of one or more of the timing generator 20, the row decoder 30, the row driver 40, the correlated double sampler (CDS) 50, the counter 60, the digital scaling unit 65, the gain controller 63, the latch 70, the column decoder 80, ramp generators 90 or 91 and a frequency converter 100.

For example, the processing circuitry may be configured as a special purpose processor to adjust an analog gain of a ramp voltage Vramp such that the gain is doubled, and generates different user gains based thereon. Therefore, the processing circuitry may improve the functioning of the image sensor itself by allowing the image sensor to operate using a reset-signal-signal (RSS) scheme, while reducing the probability that the output becomes saturated.

The pixel array 10 includes a plurality of pixel units arranged two-dimensionally. The pixel units serve to convert an optical image into an electrical output signal. The pixel array 10 is driven by receiving driving signals such as a row selection signal, a reset signal, and a charge transfer signal from the row driver 40. In addition, the converted electrical signal voltage may be provided to the correlated double sampler 50 via a vertical signal line.

The timing generator 20 provides a timing signal and a control signal to the row decoder 20 and the column decoder 80.

The row driver 30 provides driving signals for driving the plurality of pixel units to the pixel array 10 in response to the decoding by the row decoder 20. Typically, when pixel units are arranged in a matrix, a driving signal is provided for each row.

The correlated double sampler 50 receives the reset voltage and the signal voltage formed in the pixel array 10 via the vertical signal lines and holds and samples them. That is, it is possible to output a binary signal, that is, a comparison signal by comparing each of the reset voltage and the signal voltage with the ramp voltage.

The counter 60 may count the comparison signal and output a digital signal. The digital signal may be related to the brightness of the incident light applied to the pixel. Specifically, the higher the brightness of the incident light is, the more the electric charges are accumulated in the photodiodes of a pixel, and accordingly, the more the reset voltage and the signal voltage may be changed. Accordingly, the comparison signal of the ramp voltage and the signal voltage may become longer, and accordingly, the number of times that the comparison signal is counted may be increased. As a result, a larger digital signal may be generated.

The digital scaling unit 65 may scale the digital signal. For example, a digital signal may have a length ranging from 0 to 2,048 least significant bits (LSBs) before it is scaled. The LSB may be a unit of brightness of the incident light. The digital signal may be scaled by the digital scaling unit 65 so that it has a length from 0 to 1,024 LSBs. However, example embodiments are not limited thereto.

The latch 70 latches the digital signal, and the latched signal is output to an image signal processor sequentially in response to the decoding by the column decoder 80.

Referring to FIG. 2, the pixel array 10 may include a plurality of pixels P(i, j). The plurality of pixels P(i, j) may be arranged in a plurality of rows i and a plurality of columns j. A vertical signal line may be disposed in each of the plurality of columns j to output the outputs of the pixel P(i, j), that is, the reset voltage and the signal voltage $V_{signal}$.

A first ramp voltage generator 90 may generate a ramp voltage $V_{ramp}$. The ramp voltage $V_{ramp}$ is a signal for converting an analog signal into a digital signal and may have the form of a triangular wave. The first ramp voltage generator 90 may generate a ramp voltage $V_{ramp}$ by using a second clock CLK2.

The correlated double sampler 50 may compare the ramp voltage $V_{ramp}$ with each of the reset voltage and the signal voltage $V_{signal}$. The correlated double sampler 50 may include a plurality of comparators. Each of the comparators may be associated with the vertical signal lines of the respective pixels P(i, j). The correlated double sampler 50 may compare the ramp voltage $V_{ramp}$ with the reset voltage and compare the ramp voltage $V_{ramp}$ with the signal voltage $V_{signal}$, to output a comparison signal. The comparison signal may be a binary signal to indicate which one of the ramp voltage $V_{ramp}$ and the signal voltage $V_{signal}$ is larger than another. For example, the comparator may output the value of "1" when the ramp voltage $V_{ramp}$ is larger than the signal voltage $V_{signal}$, and may output the value of "0" otherwise. Alternatively, the comparator may output the value of "1" when the signal voltage $V_{signal}$ is larger than the ramp voltage $V_{ramp}$, and may output the value of "0" otherwise.

A plurality of counters 60 may be provided. The number of plurality of counters may be equal to the number of comparators of the correlated double sampler 50. That is, a comparison signal may be counted by a counter. However, example embodiments are not limited thereto.

The counter 60 may receive a first clock CLK1. The counter 60 may count the rising edge or the falling edge of the first clock CLK1 to thereby measure how long the comparison signal holds a value. For example, when a time for which the value of "1" is output is measured, the number of counting may vary depending on the magnitude of the signal voltage $V_{signal}$, and accordingly, the value of the digital signal represented by the number of counting may be determined. As mentioned earlier, the digital signal may be a digital value indicating the brightness of the incident light in association with the magnitude of the signal voltage $V_{signal}$.

The digital scaling unit 65 may receive the digital signal to scale it. In doing so, the ratio of the scaling may be determined under the control of the gain controller 63.

The gain controller 63 may control the gain of the first ramp voltage generator 90 and the digital scaling unit 65.

The first ramp voltage generator 90 may determine the gain of the ramp voltage $V_{ramp}$ through the gain controller 63. The digital scaling unit 65 may determine the scaling ratio of the digital signal through the control of the gain controller 63. A detailed description thereon will be given later Referring to FIG. 3, Each of the pixels P(i, j) may include sub-pixels P1 to P4. Specifically, each of the pixels P(i, j) may include a first sub-pixel P1, a second sub-pixel P2, a third sub-pixel P3 and a fourth sub-pixel P4. However, example embodiments are not limited thereto. For example, according to some example embodiments, each of the pixels of the image sensor may include more or less than four sub-pixels as desired.

A green color filter may be formed on the first sub-pixel P1 and the fourth sub-pixel P4. A red color filter may be formed on the second sub-pixel P2. A blue color filter may be formed on the third sub-pixel P3. That is, the first to fourth sub-pixels P1 to P4 may be arranged in the Bayer pattern. However, example embodiments of are not limited thereto.

The first sub-pixel P1 may include two photodiodes and two transfer transistors. That is, the first sub-pixel P1 may include a first photodiode PD1 and a second photodiode PD2. The first photodiode PD1 may be disposed in the first sub-pixel P1 on the left side. The second photodiode PD2 may be disposed in the first sub-pixel P1 on the right side. The first photodiode PD1 and the second photodiode PD2 may accumulate electric charges by receiving the light incident on the first sub-pixel P1.

A first transfer transistor TX_L1 may connect the first photodiode PD1 with a floating diffusion node FD. Specifically, the first transfer transistor TX_L1 may transfer the electric charges accumulated in the first photodiode PD1 to the floating diffusion node FD in response to a first transfer gate signal TG_L1. A second transfer transistor TX_R1 may connect a second photodiode PD2 with the floating diffusion node FD. Specifically, the second transfer transistor TX_R1 may transfer the electric charges accumulated in the second photodiode PD1 to the floating diffusion node FD in response to a second transfer gate signal TG_R1. The first transfer transistor TX_L1 and the second transfer transistor TX_R1 may be connected to each other through the floating diffusion node FD.

In the second sub-pixel P2, a third photodiode PD3 may be connected to a floating diffusion node FD via a third transfer transistor TX_L2, and a fourth photodiode PD4 may be connected to the floating diffusion node FD via a fourth transfer transistor TX_R2. The third transfer transistor TX_L2 may transfer electric charges accumulated in the third photodiode PD3 to the floating diffusion node FD in response to a third transfer gate signal TG_L2. The fourth transfer transistor TX_R2 may transfer electric charges accumulated in the fourth photodiode PD4 to the floating diffusion node FD in response to a fourth transfer gate signal TG_R2.

In the third sub-pixel P3, a fifth photodiode PD5 may be connected to the floating diffusion node FD via a fifth transfer transistor TX_L3, and a sixth photodiode PD6 may be connected to the floating diffusion node FD via a sixth transfer transistor TX_R3. The fifth transfer transistor TX_L3 may transfer electric charges accumulated in the fifth photodiode PD5 to the floating diffusion node FD in response to a fifth transfer gate signal TG_L3. The sixth transfer transistor TX_R3 may transfer electric charges accumulated in the sixth photodiode PD6 to the floating diffusion node FD in response to a sixth transfer gate signal TG_R3.

In the fourth sub-pixel P4, a seventh photodiode PD7 may be connected to the floating diffusion node FD via a seventh transfer transistor TX_L4, and an eighth photodiode PD8 may be connected to the floating diffusion node FD via an eighth transfer transistor TX_R4. The seventh transfer transistor TX_L4 may transfer electric charges accumulated in the seventh photodiode PD7 to the floating diffusion node FD in response to a seventh transfer gate signal TG_L4. The eighth transfer transistor TX_R4 may transfer electric charges accumulated in the eighth photodiode PD8 to the floating diffusion node FD in response to an eighth transfer gate signal TG_R4.

The first to fourth sub-pixels P1 to P4 may share the floating diffusion node FD. The floating diffusion node FD may be connected to a reset transistor RX controlled by a reset signal RG and may be connected to a gate terminal of a drive transistor DX having a source follower configuration. A selection transistor SX may determine whether to select the pixel P(i, j) with a selection signal SEL. Accordingly, the pixel P(i, j) may output the signal voltage $V_{signal}$ through a reception signal line.

In this example embodiment, each of the sub-pixels of the pixel P(i, j) includes two photodiodes in order to utilize the high-speed auto-focusing. Specifically, since the two photodiodes receive light in a sub-pixel as if they are the left eye and the right eye, it is easy to derive the focal distance at high speed. For example, in the first sub-pixel P1, auto-focusing information may be obtained by using the difference between the light sensed by the first photodiode PD1 located on the left side and the light sensed by the second photodiode PD2 located on the right side.

Therefore, information that has to be obtained finally may include the difference between the outputs from the two photodiodes and the sum of the outputs from the two photodiodes, which is the total intensity of the incident light.

Referring to FIG. 4, the first ramp voltage generator 90 may include a current source generating a ramp current $I_{ramp}$ and a ramp resistor having ramp resistance Rramp.

The ramp current $I_{ramp}$ may be generated by a variable current source. The variable current source may be connected to a supply voltage terminal VDD and may be connected to the ramp resistor in series. Thus, the ramp voltage $V_{ramp}$ may be generated as the ramp current $I_{ramp}$ flows through the ramp resistor.

In the equivalent circuit diagram of FIG. 4, the variable current source is depicted as a single circuit element. In practice, however, it may include a plurality of current cells. The number of the plurality of current cells may be associated with the range of the digital signal output by the counter 60. Specifically, in order for the counter 60 of the image sensor to output a digital signal having a maximum value of 1,024 LSBs, the number of the plurality of current cells may be 1,024. In order for the counter 60 of the image sensor to output a digital signal having a maximum value of 2,048 LSBs, the number of the plurality of current cells may be 2048. For convenience of illustration it is assumed that the number of the plurality of current cells is 1,024.

Initially, the ramp current $I_{ramp}$ flows in the variable current source, so that all of the 1,024 current cells are turned on, and that the largest current may flow. At this time, the ramp voltage $V_{ramp}$ may have the largest value. The first ramp voltage generator 90 operates by receiving the second clock CLK2. Whenever an edge of the second clock CLK2 passes, the 1,024 current cells are turned off one by one, such that the value of the ramp current $I_{ramp}$ of the variable current source $I_{ramp}$ may be decreased.

Accordingly, the ramp voltage across the ramp resistor may also be decreased sequentially. When the ramp voltage $V_{ramp}$ is decreased to a certain level, all the current cells of the variable current source are turned on simultaneously, such that the ramp current $I_{ramp}$ may be increased and accordingly the ramp voltage $V_{ramp}$ may also be increased.

Referring to FIG. 5, the ramp voltage $V_{ramp}$ may include three pulses. Each of the pulses may be in the form of a triangular wave that is decreased gradually and increased rapidly in the above-described manner.

Specifically, the ramp voltage $V_{ramp}$ may include a first pulse Reset, a second pulse, and a third pulse (PD1+PD2=SUM). Although each of the ramp voltages $V_{ramp}$ may be associated with several sub-pixels, an example in which the ramp voltage is associated only with the first sub-pixel P1 will be described, for convenience of illustration. The second to fourth sub-pixels P2 to P4 may be operated in the same manner as the first sub-pixel P1.

The first pulse Reset may correspond to the reset voltage of the first sub-pixel P1. Since the reset voltage varies relatively small, the voltage of the first pulse Reset may be decreased by the first voltage drop V1 and may be restored.

The second pulse PD1 may correspond to the signal voltage $V_{signal}$ by the first photodiode PD1 of the first sub-pixel P1. That is, the second pulse may correspond to the signal voltage $V_{signal}$ by the first photodiode PD1 of the first sub-pixel P1 of the pixel P(i, j). The signal voltage $V_{signal}$ is equal to the reset voltage plus a voltage drop, and thus the second pulse PD1 may be decreased by the second voltage drop V2 larger than the first voltage drop V1 and then may be restored.

The third pulse (PD1+PD2=SUM) may correspond to the signal voltages $V_{signal}$ by the first photodiode PD1 and the second photodiode PD2 of the first sub-pixel P1. Since the signal voltages $V_{signal}$ by the two photodiodes is larger than the signal voltage $V_{signal}$ by the one photodiode, the third pulse (PD1+PD2=SUM) may be decreased by the third voltage drop V3 which is larger than the second voltage drop V2 and then may be restored.

The first pulse Reset, the second pulse PD1 and the third pulse (PD1+PD2=SUM) all may have a first slope S1 when their voltages decrease. This may be determined depending on the period of the second clock CLK2 and the amount of change in the ramp current $I_{ramp}$.

Such form of the ramp voltage $V_{ramp}$ may result from the form of the output of the pixel P(i, j). Specifically, the pixel P(i, j) first outputs the reset voltage, then outputs the signal voltage $V_{signal}$ by the first photodiode PD1, and then outputs the signal voltages $V_{signal}$ by both the first photodiode PD1 and the second photodiodes PD2. This is referred to as a reset-signal-signal (RSS) read-out scheme.

The RSS scheme is advantageous over a reset-signal-reset-signal (RSRS) read-out scheme in terms of noise. According to the RSRS read-out scheme, a pixel outputs a reset voltage, outputs a signal voltage $V_{signal}$ by the first photodiode PD1, outputs a reset voltage again, and then outputs a signal voltage $V_{signal}$ by the second photodiode PD2.

As mentioned earlier, in order to obtain image information, the image sensor according to some example embodiments only requires the information on the sum of outputs by the two photodiodes and the difference in the outputs for auto-focusing. Therefore, according to the RSRS read-out scheme, the outputs from the photodiodes are obtained separately, are added together, and the difference between them is obtained.

In doing so, when the sum of the outputs is obtained, fixed noise may be amplified by two, and random noise, i.e., noise having different frequencies may be amplified by √2. That is to say, the noise in the sum of the two outputs may be increased.

In contrast, according to the RSS read-out scheme, there is no such amplification of noises because the sum of two outputs is output. Therefore, the fixed noise can be improved by 50% and the random noise can be improved by 30%.

According to the RSS read-out scheme, however, since the sum of the outputs by the two photodiodes and the output by the first photodiode PD1 are sensed in the same range (for example, from 0 to 1,024 LSBs), there may be a problem of saturation. For example, if the sum of outputs from two photodiodes (PD1+PD2=SUM) are saturated as 1024 LSBs, as the output PD1 by the first photodiode PD1 increases, i.e., it approaches 1,024 LSBs, the output PD2 from the second photodiode PD2 may be erroneously derived as 0 LSB (=SUM−PD1).

Referring to FIGS. 6 and 7, the image sensor according to this example embodiment may adjust the gain of the ramp voltage $V_{ramp}$ to reduce a probably of occurrence (or, alternatively, prevent) such errors due to the saturation. The "gain" of the ramp voltage $V_{ramp}$ may refer to the degree by which the signal is amplified. That is, the larger the slope at which the voltage of the pulse of the ramp voltage $V_{ramp}$ decreases is, the smaller the gain is, and vice versa. This is because the number of counting by the counter 60 is reduced as the slope at which the voltage of the pulse of the ramp voltage $V_{ramp}$ decreases increases, so that the length of the digital signal becomes smaller (and vice versa).

The image sensor may utilize two steps to adjust the gain of the ramp voltage $V_{ramp}$. First, referring to FIG. 6, as the first step, the image sensor may double the ramp current $I_{ramp}$ of the variable current source so that the magnitude of each of the pulses is doubled. It is to be noted that the pulses may have a shape of a triangular wave whose lower portion is cut, instead of a triangle wave since the ranges of the first voltage drop V1, the second voltage drop V2 and the third voltage drop V3 still have to be kept.

In the graph shown in FIG. 6, the dotted lines indicate the gains before performing the two steps. After the first step, the pulses are restored not immediately but after a certain period of time, as indicated by the solid lines. The slope of the pulses may be the second slope S2 before and after the processing of the first step. At this time, the first clock CLK1 and the second clock CLK2 may both have the same frequency.

In the second step to subsequent to the first step, the image sensor may adjust the second clock CLK2 of the ramp voltage $V_{ramp}$ to have half the frequency of the first clock CLK1 of the counter 60. By doing so, the gain of the ramp voltage $V_{ramp}$ may be changed. That is to say, the second slope S2 may become the half value, and may be changed to the first slope S1. As a result, the ramp voltage $V_{ramp}$ may have the shape of a triangle wave again, while the first voltage drop V1, the second voltage drop V2 and the third voltage drop V3 of the pulses may be maintained.

As the frequency of the second clock CLK2 is reduced by half, the rate at which the ramp voltage $V_{ramp}$ decreases is reduced by half. In addition, whenever it decreases, i.e., a current cell is turned off, the counter 60 counts twice. That is to say, if there are 1,024 current cells, the maximum number of counting become 2,048, and thus the maximum value of the digital signal may be 2,048 LSB.

Specifically, referring to FIG. 8, the signal voltage $V_{signal}$ by the first photoelectric element PD1 may be derived as the digital signal PD1 in the range of 0 to 1,024 LSBs, while the signal voltages $V_{signal}$ by both the first photodiode PD1 and the second photodiode PD2 may be derived as the digital signal SUM in the range of 0 to 2,048 LSBs. Accordingly, the digital signal PD2 by the second photodiode PD2 may be calculated by subtracting the digital signal PD1 by the first photodiode PD1 from the digital signal SUM.

Referring to FIG. 9, the first clock CLK1 is directly supplied to the counter 60, while it is converted into the second clock CLK2 in a frequency controller 100 so that it has the frequency that is half the frequency of the first clock and then is supplied to the first ramp voltage generator 90.

In this manner, the first ramp voltage generator 90 may generate a ramp voltage $V_{ramp}$ whose gain is twice. Since the gain of the ramp voltage $V_{ramp}$ is achieved by an analog circuit, it may be defined as an analog gain.

The image sensor according to this example embodiment does not require resources such as an additional current cell in order to increase the analog gain, but can double the analog gain by simply adjusting the clock. Therefore, the analog gain can be increased without increasing the overall area of the image sensor or requiring additional power consumption.

Referring to FIG. 10, the user gain may refer to a gain finally displayed to a user. Specifically, the higher the user gain is, the brighter images the user can obtain. The user gain may be expressed as a product of the analog gain and the digital gain. The digital gain may refer to the degree by which the digital signal output from the counter 60 is amplified by the digital scaling unit 65. Since the digital scaling unit 65 amplifies the digital signal by using a digital circuit, the gain thereof may be defined as the digital gain. Although the user gains are shown as ×1, ×2, ×4, ×8 and ×16 in the table shown in FIG. 10, this is merely illustrative. For example, the image sensor according to some example embodiments may achieve a user gain of ×32 or more.

As the analog gain is ×2 after the operations described with reference to FIGS. 6 and 7, the user gain of the actual image sensor may also be ×2 if the digital gain is ×1. It is to be noted that an operation mode in which the user gain is ×1 may also be required depending on the selection of the brightness.

In other words, the image sensor according to this example embodiment, may include operation modes in which the user gains are ×1, ×2, ×4, ×8 and ×16. Such operation modes with different user gains may be controlled by using the gain controller 63 of FIGS. 1 and 2.

The gain controller 63 may adjust the digital gain of the digital scaling unit 65 to ×0.5 in order to implement an operation mode with a user gain of ×1. In other words, the digital scaling unit 65 may scale the digital signal outputted by the counter 60 by half. Accordingly, for example, if the digital signal output by the counter has the length in the range of 0 to 2,048 LSBs, the digital signal may be scaled by the digital scaling unit 65 so that it has the length in the range of 0 to 1,024 LSBs.

That is, the gain controller 63 may determine the user gain required in a particular operation mode, and may adjust the analog gain and the digital gain to finally achieve the required user gain. To change the analog gain, the ramp current $I_{ramp}$ may be adjusted. To change the digital gain, a signal to change the digital gain may be applied to the digital scaling unit 65.

Specifically, when the operation mode of the image sensor requires the user gain of ×1, the gain controller 63 instructs the digital scaling unit 65 to scale the digital signal with the digital gain of ×0.5 because the analog gain is already ×2 by the operations described with reference to FIGS. 6 and 7. The digital scaling unit 65 may operate with the digital gain of ×0.5 so that the user gain is ×1.

When the operation mode of the image sensor requires the user gain of ×2, the digital gain may be set to ×1 since the analog gain is already ×2.

When the operation mode of the image sensor requires the user gains of ×4, ×8 and ×16, the ramp current $I_{ramp}$ may be set to ×½, ×¼ and ×⅛, respectively, to adjust the analog gain.

Hereinafter, an image sensor according to some example embodiments will be described with reference to FIGS. 11 and 12. Descriptions of the identical elements described in the above example embodiment will not be made to avoid redundancy.

FIG. 11 is an equivalent circuit diagram for illustrating a ramp voltage generator of an image sensor according to some example embodiments. FIG. 12 is a table showing parameters of an image sensor according to some example embodiments.

Referring to FIG. 11, an image sensor according to some example embodiments may include a second ramp voltage generator 91.

The second ramp voltage generator 91 may include a variable resistor instead of a variable current source. That is, the ramp resistance Rramp of the second ramp voltage generator 91 may be adjusted variably.

Referring to FIG. 12, the operation mode of the image sensor according to this example embodiment may be the same as that of the example embodiment shown in FIGS. 1 to 10 when the user gains are ×1 and ×2. However, in the operation modes in which the user gains are ×4, ×8 and ×16, the image sensor may reduce the ramp resistance Rramp by ½, ¼ and ⅛, instead of reducing the ramp current $I_{ramp}$. By adjusting the ramp resistance Rramp instead of the ramp current $I_{ramp}$, it may be advantageous in that the circuit can be more highly integrated and can be easily operated.

Referring to FIG. 13, the gain controller 63 of the image sensor according to the example embodiment shown in FIGS. 1 to 12 may control the analog gain and the digital gain equally according to the operation modes.

Specifically, when the image sensor according to the example embodiments requires the user gain of ×1, the analog gain may be ×2 and the digital gain may be ×0.5. This is to prevent errors due to output saturation, as described above. When the image sensor according to the example embodiments requires the user gain of ×2, the analog gain may be ×2 and the digital gain may be ×1.

When the image sensor according to the example embodiments requires the user gains of ×4, ×8 and ×16, the analog gains may be ×4, ×8 and ×16, respectively, and the digital gain may be ×1. When the user gain has high values, the analog gain is increased instead of the digital gain because of noise.

Typically, when a signal is amplified by an analog circuit, the amplification of noise is not as much as the amplification of the signal. When a signal is amplified by a digital circuit, on the other hand, the noise may be amplified as much as the signal. Therefore, in one or more example embodiments, when the user gain has a high value, the amplification of the noise can be reduced since the image sensor adjusts the analog gain instead of the digital gain.

Figure 14:
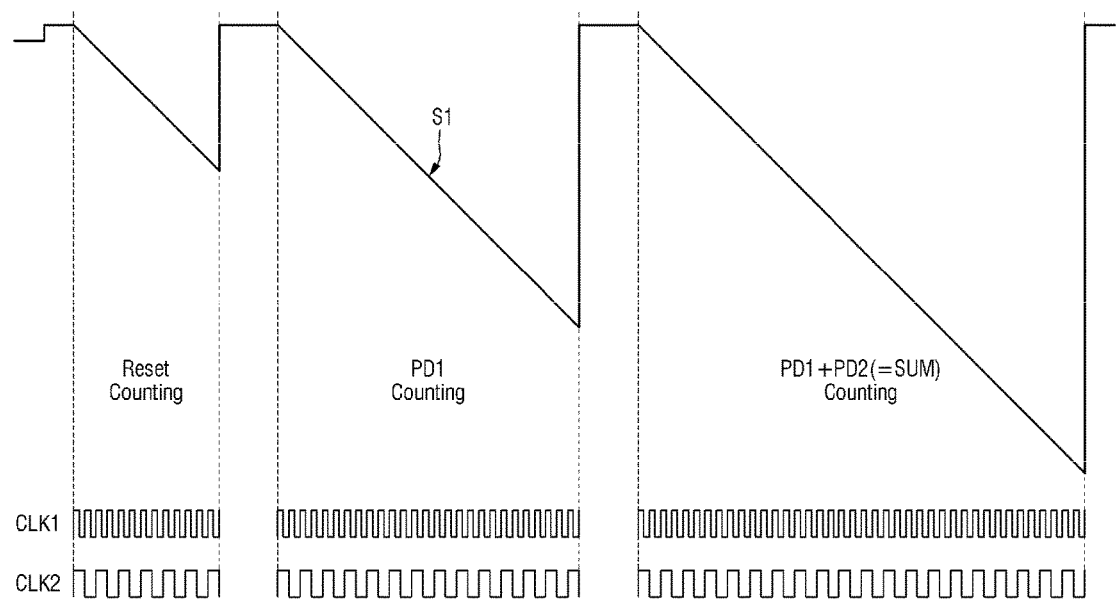
FIG. 14 is a graph for illustrating the relationships between the ramp voltage and the clocks when the user gain of the image sensor according to some example embodiments is ×2.
Figure 15:
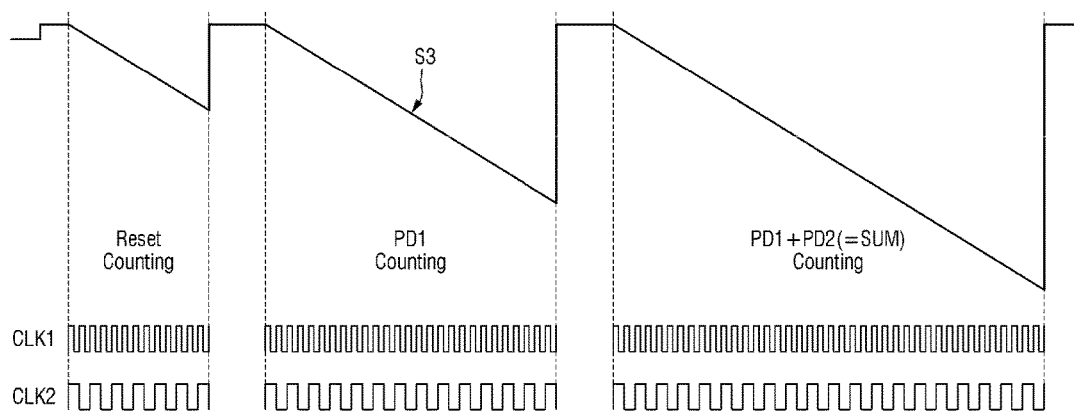
FIG. 15 is a graph for illustrating the relationships between the ramp voltage and the clocks when the user gain of the image sensor according to some example embodiments is ×4.

FIG. 14 is a graph for illustrating the relationships between the ramp voltage and the clocks when the user gain of the image sensor according to some example embodiments is ×2. FIG. 15 is a graph for illustrating the relationships between the ramp voltage and the clocks when the user gain of the image sensor according to some example embodiments is ×4.

Referring to FIG. 14, the relationships between the ramp voltage $V_{ramp}$ and the clocks when the user gain according to the example embodiment shown in FIGS. 1 to 13 is ×2 can be seen. The frequency of the first clock CLK1 is twice the frequency of the second clock CLK2. The slope when the pulses of the ramp voltage $V_{ramp}$ decreases may be the first slope S1.

Referring to FIG. 15, the relationships between the ramp voltage $V_{ramp}$ and the clocks when the user gain according to the example embodiment shown in FIGS. 1 to 13 is ×4 can be seen. The frequency of the first clock CLK1 is twice the frequency of the second clock CLK2. The slope when the pulses of the ramp voltage $V_{ramp}$ decreases may be the third slope S3. The third slope S3 may be half the first slope S1. That is, when the analog gain is ×2, the slope at which the voltage of the pulses decrease may be reduced by half. Accordingly, when the analog gain is ×8 and ×16 in the image sensor, the slope at which the voltage of the pulses decrease may be reduced by ¼ and ⅛, respectively.

Hereinafter, an image sensor according to some example embodiments will be described with reference to FIGS. 16 to 20. Descriptions of the identical elements described in the above example embodiment will not be made to avoid redundancy.

Figure 16:
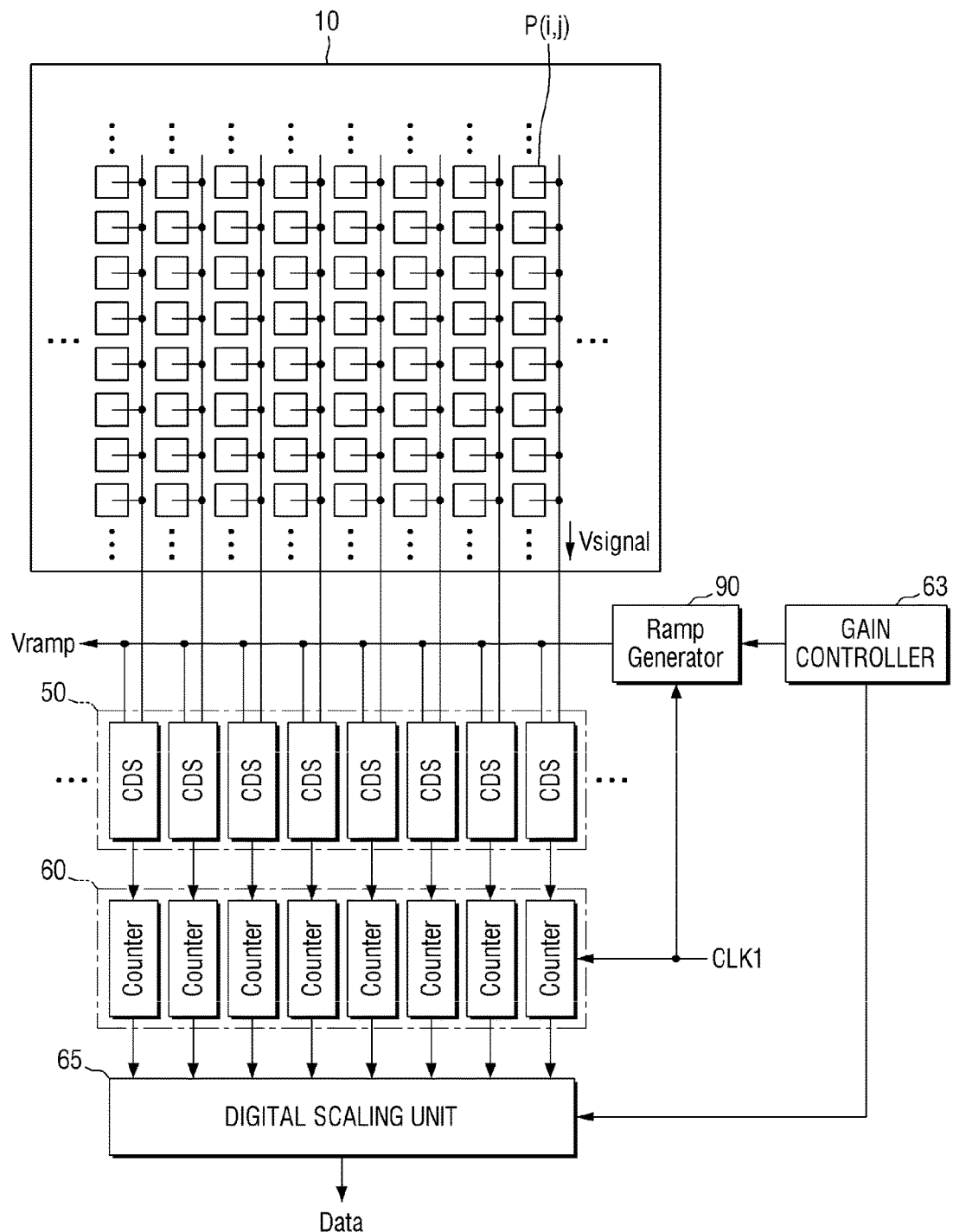
FIG. 16 is a block diagram for illustrating in detail a part of an image sensor according to some example embodiments.
Figure 19:
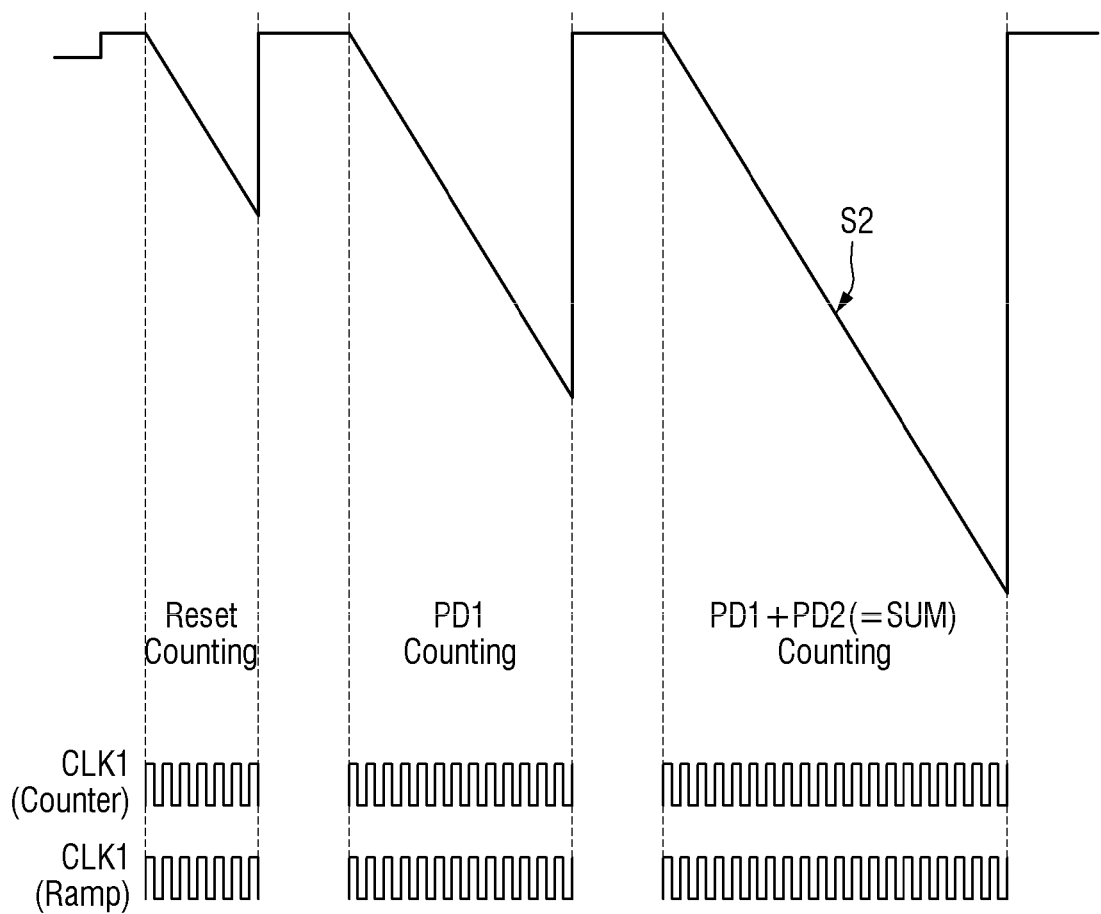
FIG. 19 is a graph for illustrating the relationship between the ramp voltage and the clocks in the second operation mode of the image sensor according to some example embodiments.
Figure 20:
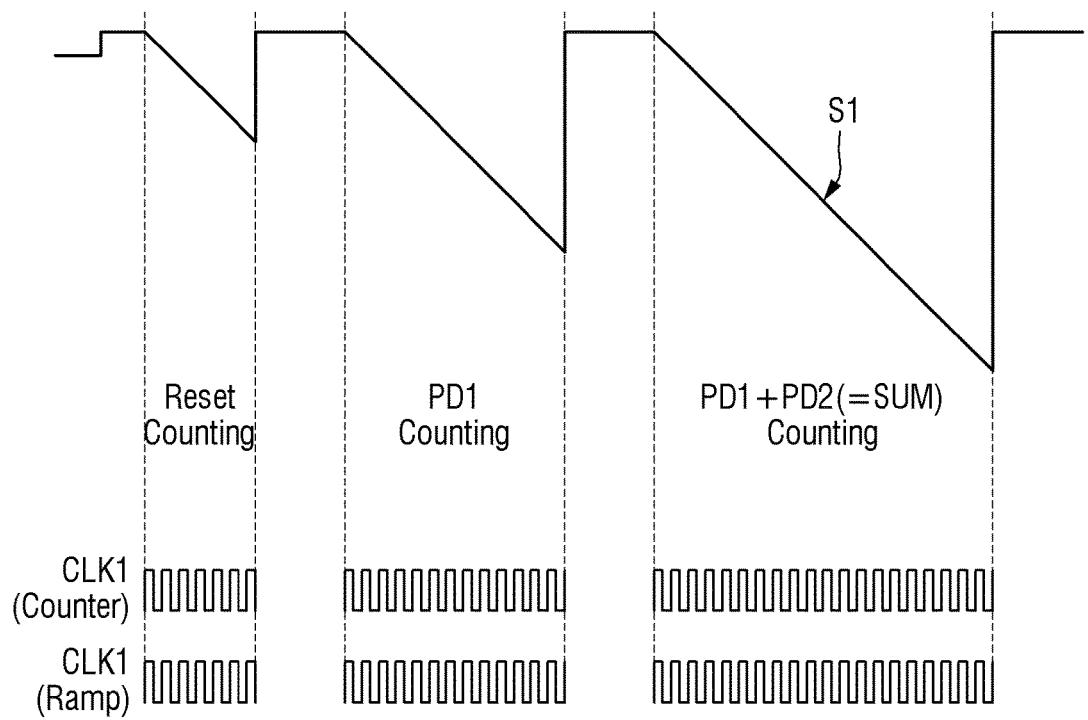
FIG. 20 is a graph for illustrating the relationship between the ramp voltage and the clocks in the third operation mode of the image sensor according to some example embodiments.

FIG. 16 is a block diagram for illustrating in detail a part of an image sensor according to some example embodiments. FIG. 17 is a table showing parameters of an image sensor according to some example embodiments. FIG. 18 is a table for illustrating the analog gains and the digital gains according to the operation modes of the image sensor according to some example embodiments. FIG. 19 is a graph for illustrating the relationship between the ramp voltage and the clocks in the second operation mode of the image sensor according to some example embodiments. FIG. 20 is a graph for illustrating the relationship between the ramp voltage and the clocks in the third operation mode of the image sensor according to some example embodiments.

Referring to FIG. 16, in the image sensor according to some example embodiments, the first clock CLK1 may be equally supplied to the first ramp voltage generator 90 and the counter 60. That is, the first ramp voltage generator 90 may use the first clock CLK1 of the counter 60, without reducing the frequency by half.

Referring to FIG. 17, the gain controller 63 of the image sensor according to some example embodiments may adjust the analog gain of the first ramp voltage generator 90 to ×1 and the digital gain of the digital scaling unit 65 to ×1, to achieve the operation mode requiring the user gain of ×1.

The gain controller 63 of the image sensor according to this example embodiment may adjust the analog gain of the first ramp voltage generator 90 to ×1 and the digital gain of the digital scaling unit 65 to ×2, to achieve the operation mode requiring the user gain of ×2. This may be done to solve the saturation problem without additional hardware or power consumption. In other words, it is not necessary to increase the analog gain, and thus no additional resources such as current cells are required.

When the operation mode of the image sensor requires the user gains of ×4, ×8 and ×16, the ramp resistance Rramp may be reduced by ½, ¼ and ⅛, respectively, to adjust the analog gain. In the image sensor according to some example embodiments, the ramp current $I_{ramp}$ may be reduced by ½, ¼ and ⅛, instead of the ramp resistance Rramp.

Referring to FIG. 18, when the image sensor according to the example embodiments requires the user gain of ×1, the analog gain may be ×1 and the digital gain may be ×1. When the image sensor according to the example embodiments requires the user gain of ×2, the analog gain may be ×1 and the digital gain may be ×2. This is to obtain amplification of the user gain without additional resources to amplify the analog gain. Accordingly, the image sensors according to the example embodiments can reduce the probably of occurrence (or, alternatively, prevent) saturation errors and can amplify the user gain without additional resources.

When the image sensor according to the example embodiments requires the user gains of ×4, ×8 and ×16, the analog gains may be ×2, ×4 and ×8, respectively, and the digital gain may be ×2. Typically, when a signal is amplified by an analog circuit, the amplification of noise is relatively small compared with the signal, and thus the amplification of noise can be reduced by adjusting the analog gain instead of the digital gain when the user gain becomes large.

Referring to FIG. 19, the relationships between the ramp voltage $V_{ramp}$ and the clocks when the user gain according to the example embodiment shown in FIGS. 16 to 18 is ×2 can be seen. The clock of the counter 60 and the clock of the first ramp voltage generator 90 may be the first clock CLK1 of the same frequency. The slope when the pulses of the ramp voltage $V_{ramp}$ decrease may be the second slope S2. This may be twice the first slope S1 of FIG. 14. This means that the analog gain is half. On the other hand, the digital gain becomes ×2, so that the example embodiment of FIG. 14 and the example embodiment of FIG. 19 may have the same user gain.

Referring to FIG. 20, the relationships between the ramp voltage $V_{ramp}$ and the clocks when the user gain according to the example embodiments shown in FIGS. 16 to 18 is ×4 can be seen. The clock of the counter 60 and the clock of the first ramp voltage generator 90 may be the first clock CLK1 of the same frequency. The slope when the pulses of the ramp voltage $V_{ramp}$ decrease may be the first slope S1. This may be twice the third slope S3 of FIG. 15. This means that the analog gain is half. On the other hand, the digital gain becomes ×2, so that the example embodiment of FIG. 15 and the example embodiment of FIG. 20 may have the same user gain.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

In concluding the detailed description, those skilled in the art will appreciate that many variations and modifications can be made to the example embodiments without substantially departing from the principles of the example embodiments. Therefore, the disclosed example embodiments are used in a generic and descriptive sense only and not for purposes of limitation.

What is claimed is:

1. An image sensor comprising:
a pixel array including pixels configured to output signal voltages, each of the pixels including first and second photodiodes and first and second transfer transistors, the first and second transfer transistors each connected between respective ones of the first and second photodiodes and a floating diffusion node;
a ramp voltage generator configured to generate a ramp voltage having a first gain such that a slope of the ramp voltage decreases based on a ramp clock;
a correlated double sampler (CDS) configured to compare the ramp voltage with signal voltages to output a comparison signal;
a counter configured to count the comparison signal according to a counter clock to output a digital signal; and
a digital scaler configured to scale the digital signal such that the digital signal has a second gain; and
a gain controller configured to,
operate in a plurality of operation modes, and
control the first gain and the second gain to derive different user gains, the different user gains being products of the first gain and the second gain, the gain controller configured to derive the different user gains by controlling the first gain and the second gain such that the second gain in a first operation mode of the plurality of operation modes is less than the second gain in a second operation mode of the plurality of operation modes.

2. The image sensor of claim 1, wherein the plurality of operation modes include the first operation mode, the second operation mode and a third operation mode, and the gain controller is configured to,
set the second gain in the first operation mode equal to half the second gain in the second operation mode, and
derive the different user gains as ×1, ×2 and ×4 in the first operation mode, the second operation mode and the third operation mode, respectively.

3. The image sensor of claim 2, wherein the gain controller is configured to set the second gain in the third operation mode equal to the second gain in the second operation mode.

4. The image sensor of claim 2, wherein the ramp voltage generator is configured to set a ramp current and a ramp resistance in the first operation mode equal to a ramp current and a ramp resistance in the second operation mode.

5. The image sensor of claim 2, wherein the ramp voltage generator is configured to set a product of a ramp current and a ramp resistance in the third operation mode equal to half a product of a ramp current and a ramp resistance in the second operation mode.

6. The image sensor of claim 2, wherein the gain controller is configured to set the first gain in the first operation mode equal to the first gain in the second operation mode.

7. The image sensor of claim 6, wherein the gain controller is configured to set the first gain in the second operation mode equal to half the first gain in the third operation mode.

8. The image sensor of claim 1, further comprising:
a frequency converter configured to set a frequency of the ramp clock equal to half a frequency of the counter clock.

9. An image sensor comprising:
pixels each including first and second photodiodes, the pixels each configured to output a reset output, a first output and a second output sequentially such that the first output is output by the first photodiode and the second output is output by the first and the second photodiode;
a ramp voltage generator configured to generate a ramp voltage having a first gain such that a slope of the ramp voltage decreases according to a ramp clock;
a correlated double sampler configured to compare the ramp voltage with each of the reset output, the first output and the second output, and to output a comparison signal based on a result thereof;
a counter configured to count the comparison signal according to a counter clock to output a digital signal;
a digital scaler configured to scale the digital signal such that the digital signal has a second gain; and
a gain controller configured to control the first gain and the second gain to derive different user gains in different ones of a plurality of operation modes, the different user gains each being a product of the first gain and the second gain, the plurality of operation modes including a first operation mode, a second operation mode, and a third operation mode requiring the different user gains of ×1, ×2 and ×4, respectively such that the second gain in the first operation mode is equal to half the second gain in the second operation mode.

10. The image sensor of claim 9, wherein the ramp voltage generator is configured to generate the ramp voltage such that the ramp voltage includes a first pulse corresponding to the reset output, a second pulse corresponding to the first output, and a third pulse corresponding to the second output.

11. The image sensor of claim 10, wherein the ramp voltage generator is configured to generate the ramp voltage such that a magnitude of a voltage drop of the second pulse is larger than a magnitude of a voltage drop of the first pulse and is smaller than a magnitude of a voltage drop of the third pulse.

12. The image sensor of claim 9, wherein the gain controller is configured to set the first gain in the first operation mode equal to the first gain in the second operation mode.

13. The image sensor of claim 9, wherein the gain controller is configured to set the second gain in the third operation mode equal to the second gain in the second operation mode.

14. The image sensor of claim 9, wherein the gain controller is configured to set the first gain in the second operation mode equal to half the first gain in the third operation mode.

15. An image sensor comprising:
a pixel array including pixels configured to output signal voltages, each of the pixels including a first sub-pixel and a second sub-pixel sharing a floating diffusion node, a reset transistor and a drive transistor, the first sub-pixel including a first photodiode, a second photodiode, a first transfer transistor and a second transfer transistor, the first transfer transistor being between the first photodiode and the floating diffusion node, and the second transfer transistor being between the second photodiode and the floating diffusion node, the second sub-pixel including a third photodiode, a fourth photodiode, a third transfer transistor and a fourth transfer transistor, the third transfer transistor being between the third photodiode and the floating diffusion node, and the fourth transfer transistor between the fourth photodiode and the floating diffusion node;
a ramp voltage generator configured to generate a ramp voltage having a first gain such that the ramp voltage decreases with a slope according to a ramp clock;
a correlated double sampler (CDS) configured to compare the ramp voltage with the signal voltages to output a comparison signal;
a counter configured to count the comparison signal according to a counter clock to output a digital signal;
a digital scaler configured to scale the digital signal such that the digital signal has a second gain; and
a gain controller configured to control the first gain and the second gain to derive user gains associated with respective ones of a plurality of operation modes, the user gains each being a product of the first gain and the second gain, the plurality of operation modes including a first operation mode, a second operation mode and a third operation mode requiring the user gains of ×1, ×2 and ×4, respectively such that the first gain in the first operation mode is equal to the first gain in the second operation mode and the second gain in the first operation mode is equal to half the second gain in the second operation mode.

16. The image sensor of claim 15, further comprising:
a frequency converter configured to set a frequency of the ramp clock equal to half a frequency of the counter clock.

17. The image sensor of claim 15, wherein
the first sub-pixel includes a first color filter formed on the first and second photodiodes, and
the second sub-pixel includes a second color filter formed on the third and fourth photodiodes, the first color filter and second color filter having different colors.

18. The image sensor of claim 17, wherein each of the pixels further comprises:
third and fourth sub-pixels, the third and fourth sub-pixels share the floating diffusion node, the reset transistor and the drive transistor with the first and second sub-pixels.

19. The image sensor of claim 18, wherein the third sub-pixel comprises a third color filter, wherein the fourth sub-pixel comprises the first color filter, and wherein the third color filter has a color different from the first and second color filters.

* * * * *